UNITED STATES PATENT OFFICE 2,198,596

STABILIZED AQUEOUS PROTEIN DISPERSION

Francis Clarke Atwood, Newton, Mass., assignor to Atlantic Research Associates, Inc., Newtonville, Mass., a corporation of Delaware No Drawing. Application April 29, 1937,
Serial No. 139,719

19 Claims. (Cl. 134—12)

The present invention relates to improved protein compositions and more particularly to low viscosity aqueous protein dispersions and method of making the same.

The principal object of my invention is to provide novel protein compositions possessing characteristics which render them particularly adaptable for various industrial purposes including the manufacture of water paints, the emulsification with oils and waxes to form various coating materials including coating materials for washable wall paper, the base for leather finishes, and for the casting of sheets, films, fibers, and the like.

Another object of my invention is to provide aqueous protein dispersions containing a protective compound for preventing chaotic hydrolytic cleavage of the protein molecule.

Another object of my invention is to provide stable protein compositions that are capable of forming protein dispersions having uniform viscosity over relatively long periods of time.

A still further object of my invention is to provide a method for stabilizing and controlling viscosity in protein dispersions.

With these objects in view and with such others as may be apparent as the description hereinafter proceeds, my invention comprises treating or hydrating protein compounds, compositions, or dispersions including milk casein, soya protein, gelatin, glues, and the like, with water-soluble formate salts and particularly the alkali metal, ammonium or substituted ammonium, e. g., amine formate salts.

Prior to the present invention low viscosity solutions of proteins which have been used in various arts as, for example, in the manufacture of protein coating materials, finishes and sheets, have been made for the most part by dissolving a protein such as casein in a substantial amount of strong alkali such as caustic soda. The resulting solutions having high pH values have been distinctly alkaline in nature and have possessed many disadvantages. For example, such solutions made from untreated or unprotected protein have been found to change materially in viscosity due primarily to hydrolytic or proteolytic cleavage and chaotic disassociation of the complex protein molecule. In addition, it was found necessary to dilute the prior solutions with water to obtain the desired low viscosity. This procedure was objectionable when a low viscosity, concentrated protein solution was desired, as the added water increased the volume and correspondingly decreased the protein concentration.

In my prior Patent No. 1,893,608, filed August 3, 1929, issued January 10, 1933, I have described certain stable high viscosity or jell-like protein solutions made by employing swelling agents such as sodium fluoride. The prior materials are listed in the well known book by Sutermeister entitled "Casein and Its Industrial Application." I have now discovered that dispersions made using the alkali metal, ammonium or substituted ammonium formates of the present invention have a much lower viscosity for the same protein concentration under the same conditions than do the solutions made using swelling agents such as sodium fluoride covered in my prior patent. In addition the yield point for my new dispersions is very low. My new protein-formate compositions are ordinarily preferred where a low viscosity, or non-jell-like highly concentrated protein dispersion is desired. In addition, my new dispersions are preferred due to low cost and also when they are to be stored for some time in containers before use, as some of the prior swelling agents such as sodium fluoride have a tendency to attack the surface of certain type containers.

In accordance with my present invention I hydrate the protein preferably before dispersion by treating the protein in the presence of water with a soluble formate salt such as sodium formate. The presence of the protein hydrating agent or buffer formate permits controlled disassociation of the complex protein molecule and prohibits uncontrolled or chaotic breaking down of the molecule. My invention also includes the dispersion of the protein in the presence of the soluble formate salts as this treatment has also been found to provide for an orderly depolymerization of the protein molecule. My invention further includes the subsequent addition of soluble formate salts to protein dispersions as a means for controlling and maintaining constant viscosity. As it has been found that strongly alkaline protein solutions tend toward unstableness, the final pH value of my improved dispersions should be slightly acidic or essentially neutral. It is preferred to maintain the pH values between 4.6, the iso-electric point of casein, to 8.5, the approximate value at which the indicator phenolphthalein turns pink.

The term "alkaline formate salts" as used in the specification and claims includes inorganic alkaline salts such as the sodium, potassium and ammonium combinations and organic alkaline substituted ammonium or amine salts including primary, secondary and tertiary amine combinations.

In order to produce the desired hydrating of the protein, I employ an aqueous solution of a soluble formate salt, good results having been obtained with sodium and potassium formates, although I prefer to employ the ammonium, substituted ammonium or amine salts including triethanol amine, pyridine, etc. formate combinations. In practice I have found that as a general rule the protein and aqueous formate salt mixture should be vigorously stirred in the cold from about 1 to 24 hours or while heated, preferably at a temperature of 140° to 160° F. for about 1 to 3 hours, time and temperature depending on the volume of material treated, viscosity desired and the type of dry film required. When the casein is subjected to higher temperatures around 180°–230° F. or about 5 to 10 pounds steam pressure the casein molecule undergoes a change which increases the water resistance of the film or fiber on drying out. The exact change in the casein molecule is unknown although my investigations indicate that casein when subjected to high temperatures and pressures undergoes polymerization.

Although my invention is not limited by any particular theory of operation, the efficiency of the salt in causing the hydrating, buffering or stabilizing action on the protein molecule appears to be due to the presence of the formate anion in the solution. The hydration of the protein molecule enables the protein to be dispersed in a relatively small amount of alkali including mild alkaline or essentially neutral reacting salts and enables stable dispersions of the protein having a relatively low viscosity to be made, which are acidic or essentially neutral in nature, possessing the desired flow characteristics and many other practical advantages not possessed by the high viscosity or strongly alkaline solutions now on the market.

The hydration of the protein also enables the protein to be dispersed in the presence of small amounts of other slightly alkaline or essentially neutral chemicals such as the soluble soaps of the fatty acid series including both saturated and unsaturated acids, salts of many aromatic and other complex organic acids such as the phenates, benzoates, salicylates, tartrates, oxalates, etc., including alkali, alkyl, aryl, hydroxy alkyl and heterocyclic amine soaps and salts as well as the soluble sulphonates and naphthenates derived from petroleum. In addition, the ammonium and substituted ammonium or amine combinations with the aliphatic acid series including acetic and acrylic acids and acids such as furovic, mucic, glutamic, acids, etc., together with aromatic acids such as phthalic acid have been found to be extremely good dispersing agents. I have also discovered that casein treated with alkali metal formates may be dispersed with boric or silicic acids in the absence of added alkaline material. The preferred soap or salt dispersing agents may be preformed although it has been found practical in some instances to add the alkaline or soap or salt forming material to the acid-protein solution separately and form the soap or salt in situ. When the dispersing agent is formed in situ the order of addition of the soap or salt forming ingredients is important and particularly so when the material is to be used for making transparent films. Mixtures of the dispersing agents may also be used.

In addition, when substantially greater amounts of ammonium or substituted ammonium formate salts are used, I have discovered that the hydrated protein may also be dispersed without the addition of other chemicals by heat or pressure or preferably by application of both heat and pressure.

The following examples showing ingredients of various protein dispersions made in accordance with my invention employing a soluble formate salt will serve for illustrative purposes. Example I shows a casein dispersion made with a small amount of strong alkali; Example II shows a casein dispersion made with a mild alkaline material; Example III shows a casein dispersion made with a neutral soap of a higher fatty acid; and Example IV shows a casein dispersion made in accordance with my invention without the addition of other chemicals.

EXAMPLE I

| | Pounds |
|---|---|
| Water | 100 |
| Casein | 25 |
| Sodium formate | 2.5 |
| Sodium hydrate | 0.7 |

While in the above and following examples I have used 10 per cent formate salt based on the weight of the casein, the preferred range I have found to be from 5 to 15 per cent formate salt based on the weight of the casein.

EXAMPLE II

| | Pounds |
|---|---|
| Water | 100 |
| Casein | 25 |
| Potassium formate | 2.5 |
| Borax | 3 |

EXAMPLE III

| | Pounds |
|---|---|
| Water | 100 |
| Casein | 25 |
| Sodium formate | 2.5 |
| Triethanolamine oleate | 2.5 |

EXAMPLE IV

| | Pounds |
|---|---|
| Water | 100 |
| Casein | 25 |
| Ammonium formate | 8 |

It will be understood by those skilled in the art that in place of the alkalies and alkaline materials used in Examples I and II that other alkalies and alkaline materials including potassium hydroxide, ammonium hydroxide, sodium carbonate and sodium bicarbonate may be employed. It will also be understood by those skilled in the art that in place of the soap used in Example III other soaps including sodium, potassium, ammonium, alkyl amines including mono-di-tri-methyl, ethyl, propyl and butyl amines and hydroxy alkyl amines including mono-di-triethanol, propanol, and butanol amine combinations with oleic, stearic, palmitic, ricinoleic, and lauric acids and the acids derived from butter fats present in buttermilk casein, or from lard, perilla, cocoanut, olive, peanut, cottonseed, fish, sunflower, sesame, safflower, China wood, soya, corn, linseed, mustard, rape, and castor oils may be used as well as acids derived from pentoses, hexoses and other polyoses. In practice, a dispersing agent comprising a mixture of soaps of the various fatty acids has been found to give excellent results and is preferred. It will also be understood by those skilled in the art that in place of the ammonium formate used in Example IV other formate salts such as the various amine, e. g., methyl, ethyl, propyl amines; various hydroxy amines, e. g., ethanol, butanol amines; and various heterocyclic and aryl amines, e. g., pyridine, combinations may be used.

The following examples giving ingredients that may be used in the preparation, in the usual manner, of various industrial compositions employing my improved protein dispersions prepared for example in accordance with one of the above examples will serve for purposes of illustration.

Example V.—Paint

| | Pounds |
|---|---|
| Dispersed casein | 100 |
| Lithopone | 100 |
| Mica | 10 |
| Asbestine | 20 |

Example VI.—Oil coating

| | Pounds |
|---|---|
| Dispersed casein | 100 |
| China wood oil | 10 |

Example VII.—Paper coating

| | Pounds |
|---|---|
| Dispersed casein | 100 |
| China clay | 75 |
| Titanium dioxide | 25 |
| Japan wax | 10 |

Example VIII.—Leather finish

| | Pounds |
|---|---|
| Dispersed casein | 100 |
| Titanium dioxide | 25 |
| Linoleic acid | 15 |

Example IX.—Sheeting material

| | |
|---|---|
| Dispersed casein pounds | 100 |
| Formaldehyde solution per cent | 1 to 2 |

The various industrial compositions illustrated above are prepared by vigorous mixing of the ingredients in the usual manner, the specific technique being familiar to those employed in the various arts. It will be understood by those skilled in the art that various other mineral pigments may be used in the paint, paper coating, and leather finish compositions and that other oils including non-drying, semi-drying, and drying oils and waxes may be used in the oil coating, paper coating, and leather finish compositions.

By the present invention I have provided a means for the formation of acid or essentially neutral, e. g., pH 4.6 to 8.5, stable aqueous protein dispersions of low viscosity and high concentration adaptable for various industrial applications. In addition to the specific industrial compositions above noted, I have found my novel protein dispersions to be particularly adaptable for the base in printing ink, for the preparing of stable glues and as an important ingredient in various natural and synthetic resin and like plastic compositions.

While I have illustrated my invention with specific examples, it will be understood that my invention is not limited thereto. As indicated above, other ingredients may be used in place of the specific ingredients described and, in addition, the proportions of the same may be varied to meet the desired needs. All subject matters coming within the spirit and scope of my invention are intended to be covered by the claims appended hereto.

I claim:

1. A method of preparing an improved stabilized protein composition which comprises hydrating protein in the presence of water with a soluble alkaline formate salt, said composition containing about 5 percent to 32 percent of said formate salt based on the weight of said protein, and having a pH value of about 4.6 to 8.5.

2. A method of preparing stable protein dispersions which comprises treating protein with a soluble alkaline formate salt in the presence of water so as to hydrate the protein and then dispersing the protein, said dispersions containing about 5 percent to 32 percent of said formate salt, having pH values of about 4.6 to 8.5 and being characterized by uniform viscosity over long periods of time.

3. A method of preparing stable aqueous protein dispersions which comprises treating protein with an alkaline formate salt in the presence of water so as to hydrate the protein and then dispersing the protein with an alkaline material, said dispersions containing about 5 percent to 32 percent of said formate salt, having pH values of about 4.6 to 8.5 and being characterized by uniform viscosity over long periods of time.

4. A method of preparing stable aqueous protein dispersions which comprises treating protein with an alkaline formate salt in the presence of water so as to hydrate the protein and then dispersing the protein with soluble soaps of higher fatty acids, said dispersions containing about 5 percent to 32 percent of said formate salt, having pH values of about 4.6 to 8.5 and being characterized by uniform viscosity over long periods of time.

5. A method of preparing stable protein dispersions having pH values of about 4.6 to 8.5 and being characterized by uniform viscosity over long periods of time, which comprises dispersing the protein in the presence of an alkaline formate salt in an amount of about 5 percent to 32 percent based on the weight of the protein.

6. A method of stabilizing and controlling viscosity in protein dispersions having pH values of about 4.6 to 8.5, which comprises adding, based on the weight of protein, about 5 to 15 percent of an alkali formate salt to the protein dispersion.

7. As a new article of manufacture, a formate stabilized hydrated protein composition, containing about 5 percent to 32 percent of an alkaline formate salt based on the weight of said protein, and having a pH value within the range of 4.6 to 8.5.

8. As a new article of manufacture, a stable protein dispersion containing 5 percent to 32 percent of an alkali formate salt based on the weight of said protein, said dispersion having pH values of about 4.6 to 8.5, and being characterized by uniform viscosity over long periods of time.

9. As a new article of manufacture, a stable aqueous protein dispersion containing 5 percent to 32 percent of alkaline formate salt based on the weight of said protein and an alkaline material, said dispersion having pH values of about 4.6 to 8.5 and being characterized by uniform viscosity over long periods of time.

10. As a new article of manufacture, a stable protein dispersion containing 5 percent to 32 percent of alkaline formate salt based on the weight of said protein and a soluble soap of a higher fatty acid, said dispersion having pH values between 4.6 and 8.5 and being characterized by uniform viscosity over long periods of time.

11. As a new article of manufacture, a protein paint comprising a protein dispersion containing 5 percent to 32 percent of an alkali formate salt based on the weight of said protein and pigment, said dispersion having a pH value of about 4.6 to 8.5 and being characterized by uniform viscosity over long periods of time.

12. As a new article of manufacture, a protein coating composition comprising a protein dispersion containing 5 percent to 32 percent of an alkaline formate salt based on the weight of said protein, said composition having a pH value of about 4.6 to 8.5 and being characterized by uniform viscosity over long periods of time.

13. An aqueous protein dispersion containing 5 percent to 15 percent of an alkaline formate salt based on the weight of said protein, said dispersion having a pH value of about 4.6 to 8.5 and being characterized by uniform viscosity over long periods of time.

14. An aqueous casein dispersion containing about 5 percent to 15 percent of sodium formate based on the weight of the casein, said dispersion having a pH value of about 4.6 to 8.5 and being characterized by uniform viscosity over long periods of time.

15. An aqueous casein dispersion containing 5 percent to 15 percent of ammonium formate based on the weight of said casein, said dispersion having a pH value of about 4.6 to 8.5 and being characterized by uniform viscosity over long periods of time.

16. An aqueous casein dispersion containing 5 percent to 15 percent of an amine formate salt based on the weight of said casein, said dispersion having a pH value of about 4.6 to 8.5 and being characterized by uniform viscosity over long periods of time.

17. An aqueous casein dispersion containing 5 percent to 15 percent of an ethanolamine formate salt based on the weight of said casein, said dispersion having a pH value of about 4.6 to 8.5, and being characterized by uniform viscosity over long periods of time.

18. A stable low viscosity concentrated aqueous pigmented casein paint containing 5 to 15 percent sodium formate based on the weight of casein, said paint having a pH value of 4.6 to 8.5 and being characterized by freedom from changes in viscosity due to hydrolytic dissociation of the casein molecules.

19. A concentrated aqueous pigmented casein paint containing 5 percent to 32 percent of an alkaline formate salt based on the weight of the casein, said paint having a pH value of 4.6 to 8.5 and being characterized by freedom from changes due to hydrolytic dissociation of the casein molecules.

FRANCIS CLARKE ATWOOD.